United States Patent [19]

Frye

[11] 4,157,672

[45] Jun. 12, 1979

[54] HIGH BULK SLITTER

[75] Inventor: Kenneth G. Frye, Lee, Mass.

[73] Assignee: Lenox Machine Company, Inc., Lenox, Mass.

[21] Appl. No.: 810,575

[22] Filed: Jun. 27, 1977

[51] Int. Cl.[2] ................................................ B23D 19/06

[52] U.S. Cl. .......................................... 83/500; 83/499; 83/504; 83/664

[58] Field of Search ..................... 83/424, 425.2–425.4, 83/41, 430, 500–504, 499, 498, 508.2, 508.6, 664, 665, 676

[56] References Cited

U.S. PATENT DOCUMENTS

| | | | |
|---|---|---|---|
| 78,707 | 6/1868 | Yeoman | 83/430 |
| 1,315,340 | 9/1919 | Scully | 83/430 |
| 2,329,469 | 9/1943 | Huck | 83/500 |
| 2,377,130 | 5/1945 | Cohen | 83/665 |
| 3,172,326 | 3/1965 | Hamilton | 83/665 |
| 3,176,566 | 4/1965 | Patterson, Jr. | 83/498 X |
| 3,194,097 | 7/1965 | Joannes et al. | 83/499 X |
| 3,465,631 | 9/1969 | Reeder, Jr. | 83/500 |
| 3,785,232 | 1/1974 | Frye et al. | 83/500 X |
| 3,828,633 | 8/1974 | Klingen | 83/500 X |

FOREIGN PATENT DOCUMENTS

| | | | |
|---|---|---|---|
| 167492 | 6/1950 | Austria | 83/501 |
| 528241 | 6/1931 | Fed. Rep. of Germany | 83/502 |
| 971477 | 2/1959 | Fed. Rep. of Germany | 83/644 |

*Primary Examiner*—J. M. Meister

*Attorney, Agent, or Firm*—Hill, Van Santen, Steadman, Chiara & Simpson

[57] ABSTRACT

A high bulk traveling web paper slitter for slitting a traveling web of a single layer or multiple layers with an unwinder for supplying the web and web processing equipment such as winders, sheeters, printing presses, etc., which take up the web and a slitting station having upper and lower rotating sharp edged slitting blades for slitting moving webs, and both the upper and/or lower sections can incorporate web support means with either or both driven independently or by the web and having drum surfaces on each side with the means suppporting the web reducing the dust, and the blades and support means being axially adjustable in position.

4 Claims, 6 Drawing Figures

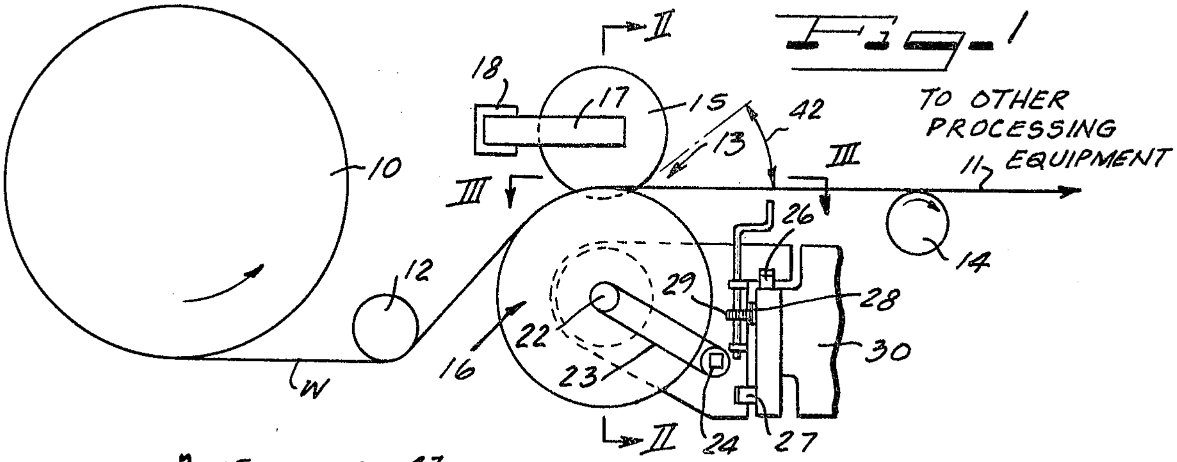
FIG. 1
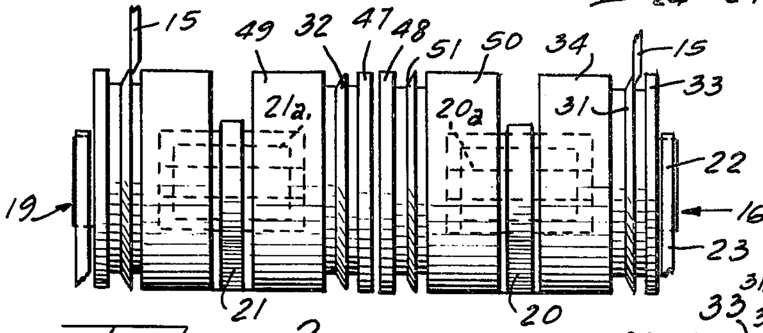
FIG. 2
FIG. 4
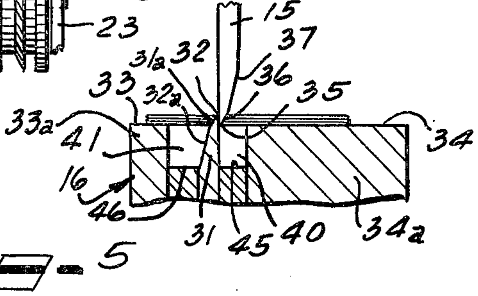
FIG. 3
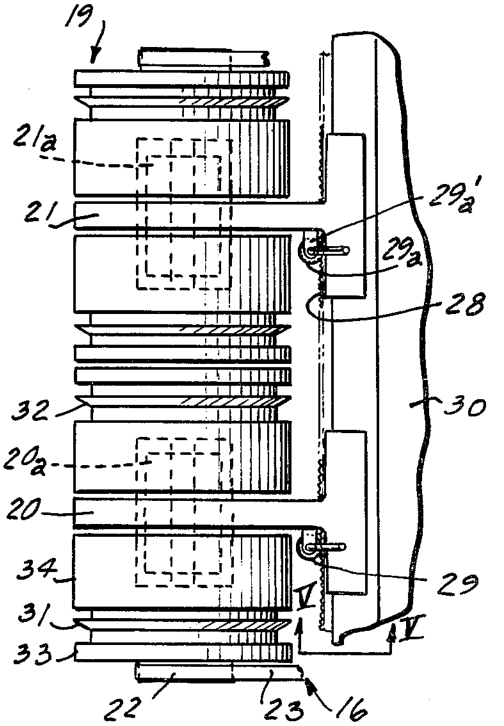
FIG. 5
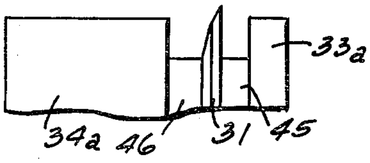
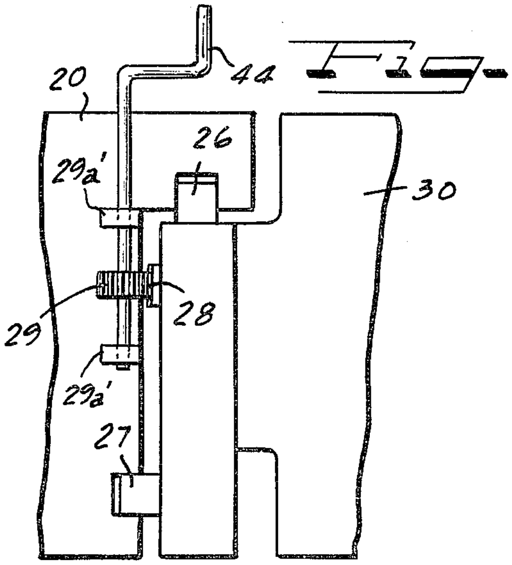
FIG. 6

HIGH BULK SLITTER

BACKGROUND OF THE INVENTION

The present invention relates to improvements in web slitting mechanisms, for traveling paper slitters capable of cutting multiple or single layer webs having considerable bulk.

In the development of paper web slitters which are capable of cutting a web and traveling at high speed, commercial slitters frequently employed an annular sharp edged blade on top which coacts with the side edge of a drum or band below the web and the coaction of the sharp edge of the knife and the side of the band perform the shearing action. The edge of the drum may be ground to form a slight angle of several degrees. The theory of shearing web material is to create as high a unit load on the surface of the material as possible at the cut point in order to penetrate and sever the individual fibers of the paper web. Any action which occurs at the point of shearing that does not precisely cut the fibers, but instead results in a tearing of the fibers will result in a poorer, less precise edge and will result in the generation of dust which can become very undesirable at all speeds. It has been found that cutting high bulk webs such as board or multiple sheets will create a degeneration of the cut as the amount of bulk or thickness increases thus creating a poorer cut and increasing the dust. In a conventional slitter as above described, the top slitter blade will create a higher unit load on the top surface of the paper than the bottom drum which offers no sharp point to the paper. Thus, the top knife does more cutting work than the bottom drum edge and the more bulk that the top knife must penetrate, the more the quality of the cut deteriorates as the blade passes further into the web. In a multiple web situation such as in a sheeter or a high bulk operation such as that for cutting board, the same theory applies.

In accordance with the principles of the present invention, the cutting edge at the bottom of the sheet is formed substantially the same as for the top of the sheet, and this is done in a manner without sacrificing the advantages of the former structures which cut against a drum. In the present arrangement, both the top and bottom cutting knives do equal work and, therefore, the amount of bulk going through the knives can be substantially increased. Instead of using a bottom drum which acts as an anvil, a sharp blade is employed in such a manner so that both the top and the bottom of the sheet are subjected to a similar high unit load. It has been found that this arrangement can be made operative in a manner that achieves satisfactory high bulk cutting at high speeds and substantially reduces the amount of dust created by providing a support for the sheet immediately adjacent the lower cutting knife in the form of an annular support band which has a support surface for the sheet of substantially the same outer diameter as the lower knife. The supporting band and lower knife can be carried on the same drum to rotate at substantially the surface speed or at a faster speed than that of the traveling web and can be turned by the web or be driven by a separate drive. Further adjustability for obtaining control and selection of the widths of sheets to be formed from a traveling web can be obtained by providing multiple drum knives and drum supporting band surfaces and making the drum laterally adjustable relative to the travel of the web. If the drum is non-driven, the traveling web is allowed to wrap the drum for driving engagement between the web and drum surface.

In high speed paper web cutting, the problem of dust is a serious one and creates limiting parameters of operation and thickness of bulk being cut. As to the thickness in which multiple sheets can be cut, this is limited by the quality of cut produced in the intermediate sheets; and as the number of multiple sheets is increased, a point will be reached wherein the quality of cut through the innermost sheets becomes unsatisfactory for commercial grade sheets. Various factors, of course, influence the dust created such as the furnish used, i.e., the amount of distribution of fines, the compressibility factor of the sheets, the total thickness, the coating used, etc. The generation of dust also can make it necessary for frequent shut-downs for replacement or sharpening of the knives thereby reducing the overall output of a commercial machine and increasing the cost of operation. Slit quality and dust are primary factors, and these have been found to be affected by sheet flutter, incorrect penetration of the cutter, improper loading, incorrect shear angle, slitter vibration, machine vibration, excessive wear, as speeds increase as well as thickness and bulk of the web increase.

It is accordingly an object of the present invention to provide an improved slitter of the type above described which is capable of cutting traveling webs and providing an improved quality of the cut edge and reducing the amount of dust generated by the cut.

A further object of the invention is to provide an improved slitter which is capable of operating at higher speeds and with the generation of less dust and is capable of handling higher bulk with satisfactory slitting operation.

A still further object of the invention is to provide an improved slitter which corrects problems heretofore present in previous slitters.

Other objects, advantages and features will become more apparent with the teaching of the principles of the invention in connection with the disclosure of the preferred embodiments thereof in the specification, claims and drawings, in which:

DESCRIPTION OF THE DRAWINGS

FIG. 1 is a somewhat schematic side elevational view of a mechanism embodying the principles of the present invention;

FIG. 2 is a vertical sectional view taken substantially along line II—II of FIG. 1;

FIG. 3 is a horizontal sectional view taken substantially along line III—III of FIG. 1;

FIG. 4 is an enlarged fragmentary sectional view illustrating the mechanism located at a point where a slit is made;

FIG. 5 is another view of FIG. 4 showing a modification in the arrangement of the slitting knives; and FIG. 6 is a fragmentary sectional view taken substantially along line VI—VI of FIG. 3.

DESCRIPTION

As illustrated in FIG. 1, a web W is unwound at high speed off of an unwinding roll 10 which is suitably supported on a hub and bearings, not shown. The web passes through a slitting station 13 where longitudinal slits are formed parallel to the web and the slit strips of the web pass to other processing equipment such as winders, sheeters, printing presses and supercalenders generally indicated by the nomenclature at 11. The web is guided into the slitter by a guide roll 12, and the strips are guided away from the slitter by a roll 14 which may spread the strips to prevent their interfering at their edges.

The slitting mechanism includes a plurality of upper rotary sharp edged slitting blades 15 supported on individual or the same brackets 17 on supports 18. The knives may be spring- or air-loaded to coact with the lower cutting edges, and are laterally adjusted to a predetermined position. The support mechanism for the upper blades will be of a type well known to those versed in the art and need not be described in detail.

Positioned below the traveling web is a rotary slitter drum unit 16. Both the drum unit 16 and the blades 15 are rotatably mounted on suitable bearings for rotation about horizontal axes extending substantially transverse to the moving web. The blade 15 may be made slightly adjustable so that it can be cocked a very small degree relative to the axis of the drum unit 16, but for discussion purposes, the axis of the drum unit 16 will be substantially at right angles and transverse to the direction of travel of the web W.

As illustrated in FIGS. 1 and 3, the drum may be comprised of several drum units as illustrated at 16 and 19. The units 16 and 19 may be combined in a single unit or a multiple of units may be arranged along the width of the web. Where very wide webs are to be handled, multiple units are preferred in that the web support bearing arrangement at spaced locations is better for slit quality, and the individual drums can be moved easily for proper cross machine placement.

One bearing arrangement which may be employed will involve separate brackets such as 20 and 21 for drum units 16 and 19 with support bearings **20*a* and 21*a*. The drums may be driven in rotation due to their surface contact with the traveling web or may be driven by separate drive mechanism illustrated somewhat schematically by a pulley 22 at the end of the drum 16 driven by a belt 23** and all drums will be driven at the same speed of rotation.

The support brackets such as 20 and 21 are movable on a support frame 30 so as to change the lateral location of the drums in order to change the location of the slits along the width of the web. The upper blades, of course, are adjusted accordingly when an adjustment is made.

For lateral adjustment, the brackets supporting the drums are carried on slide bearings 26 and 27 on the frame 30. Other types of support bearing arrangements may be employed and these are shown by way of example only. Lateral adjustment means may be provided by pinions 29 and **29*a*, rotated by hand cranks 44 on brackets 29*a'*, FIG. 6. The pinions engage a rack 28 mounted on the frame 30**. Rotation of the pinions will laterally position the brackets and drum units where desired. It will be understood that other lateral adjusting mechanisms could be employed such as threaded members.

As illustrated in FIG. 4, the drum units such as 16 are comprised of drums **33*a* and 34*a*, the drum knife 31 and circular plates 45 and 46 which support the knife 31 between the drums 33*a* and 34*a*. For this purpose an axial clamping means such as a tightenable bolt, not shown, extends through the center of the drum unit. The drum unit can be disassembled and the drums 33*a* and 34*a* can be changed in location as shown in FIG. 5 thereby changing the position of the drum knife 31. Also, the plates can be stacked in different arrangements with additional plates added, or plates of different thicknesses to change the position of the drum knives and thereby attain additional variations in spacing. For example, in FIG. 2 the drum units 16 and 19 are shown with the narrower drums 47 and 48 adjacent each other and the wider drums 49 and 50 located inwardly from the ends of the drum units. By reversing the position of the drums 47 and 49, and/or reversing the position of the drums 48 and 50, we seen that the position of the knives 32 and 51** will be changed relative to each other. This increases the flexibility of the spacing of the knives for slitting sheets of various widths. Exact adjustment is of course obtained by the handcranks which shift the lateral position of the drum units.

The surfaces of the drum units have a drum knife 31 which is in intermeshing engagement with the upper blade 15. The blade 15 has an outer annular cutting edge 35, and the drum knife 31 has an annular outer cutting edge 32 so that the surface of the web is engaged by sharp edges from both sides performing a shearing operation which enters both surfaces of the webs and applies an equal pressure to both sides. This effects a more satisfactory shear creating less tearing and generating substantially less cutting dust. Closely adjacent the knife 31 is an annular support surface 34 on the drum **34*a*, and this cutting edge 32 of the drum knife 31 has substantially the same outer diameter as the support surface plus or minus 0.060". In a preferred form, a second annular support surface 33 on the drum 33*a* is positioned at the other side of the knife 31 so that stability and support to the web is afforded by the annular surfaces 34 and 33 coacting with the mating cutting actions of the blade 15 and the knife 31. The grooves 40 and 41 formed at each side of the knife 31 between the knife and the support bands 33 and 34** are believed to also aid in controlling and stabilizing the traveling sheet.

The blade 15 and the knife 31 are cut back to form a sharp edge, and the lateral surface of the blade 15 is relieved at 36 immediately adjacent the cutting edge 35 to form a first angle e.g. less than 87°, and a surface 37 immediately adjacent thereto is relieved at a sharper angle. This dual angle arrangement also contributes to improved cutting and reduction of dust. It is to be understood that a blade with a single low angle is also contemplated as a structure in accord with the principles of the invention.

The knife 31 is similarly relieved with a surface **31*a* immediately adjacent the cutting edge 32 being formed at the first angle and a second inwardly located second surface 32*a* having a sharper angle. This could also be a single angle, instead of two angles. That is, the knife preferably is sharp edged but may have a flat annular surface with a sharp side edge and the edge relieved to provide a cutting shoulder. The mechanism is illustrated as cutting a stack of sheets in FIG. 4**.

In operation, the web which may be a single sheet or may be a heavy sheet or multiple sheets passes through the slitting station 13 and the upper blades 15 are selectively located at the locations where slits are to be made. Thus, as illustrated in FIG. 2, the blades shown at 15 may be positioned to engage the outermost knife edges of the drums. They also may be positioned to engage the other knife edges shown, and by selecting one or more of the knife edges and adjusting the drums, an infinite variation in slitting widths can be obtained. This also points out the advantages in having separate units so that they can be adjusted relative to each other and for such adjustment, separate drive mechanisms illustrated in FIG. 3 could be employed for each of the brackets of each drum unit if the web is not used for driving purposes.

The web passes through the slitting station being cut from both sides by the sharp cutting edge and possibilities of flutter or uncontrolled movement are eliminated by the immediate lateral support provided by the drum support bands such as 33 and 34.

Thus, it will be seen that I have provided a mechanism which meets the objectives and advantages above set forth and provides a substantial advance in the paper slitting art enabling the substantial reduction of dust and making possible cutting multiple webs of thicknesses and bulk exceeding that which could be cut with devices heretofore available.

It is preferable but not mandatory that the upper blade and the lower knife should be of as large a diameter as practical and preferably of a size such that the angle between the tangent to the cut point on the knife and the surface of the web or between the surface of the web and the tangent to the cut point on the blade is less than 10° as the web enters the slitting station. This is designated by number 42.

I claim as my invention:

1. A high bulk traveling web paper slitter for slitting a web unit having a single layer or multiple layers of paper web forming a continuous slit to divide the web into narrower sheets comprising in combination:

unwinding means for supplying a traveling web to be slit in multiple lengths;

means for receiving the web after it has been slit;

a slitter mechanism between the unwinding means and the receiving means and including rotary drum units rotatably supported on an axis extending transversely of the direction of travel of the web with each rotary drum unit having a plurality of annular sharp edged drum knives and an annular support surface band closely adjacent each of the knives being of substantially the same outer diameter as the knife;

a plurality of opposing slitter blades selectively positioned to coact with the drum knives;

and means for adjusting the position in an axial direction of each of the drums relative to each other to change the spacing between blades on respective drum units so that said blades can selectively engage different knives on the drums in different positions.

2. A high bulk traveling web paper slitter for slitting a web unit having a single layer or multiple layers of paper web forming a continuous slit to divide the web into narrower sheets comprising in combination:

unwinding means for supplying a traveling web to be slit in multiple lengths;

means for receiving the web after it has been slit;

a slitter mechanism between the unwinding means and the receiving means and including rotary drum units rotatably supported on an axis extending transversely of the direction of travel of the web with each rotary drum unit having a plurality of annular sharp edged drum knives and an annular support surface band closely adjacent each of the knives being of substantially the same outer diameter as the knife;

a plurality of opposing slitter blades selectively positioned to coact with the drum knives;

means for adjusting the position in an axial direction of each of the drums relative to each other to change the spacing between blades on respective drum units so that said blades can selectively engage different knives on the drums in different positions;

and the diameter of said slitting blade and the diameter of said drum knife being such that the angle developed between the tangent line at the cut point of the blade and the line of the paper is less than 10°.

3. A high bulk traveling web paper slitter for slitting a web unit having a single layer or multiple layers of paper web forming a continuous slit to divide the web into narrower sheets comprising in combination:

unwinding means for supplying a traveling web to be slit in multiple lengths;

means for receiving the web after it has been slit;

a slitter mechanism between the unwinding means and the receiving means and including rotary drum units rotatably supported on an axis extending transversely of the direction of travel of the web with each rotary drum unit having a plurality of annular sharp edged drum knives and an annular support surface band closely adjacent each of the knives being of substantially the same outer diameter as the knife;

a plurality of opposing slitter blades selectively positioned to coact with the drum knives;

means for adjusting the position in an axial direction of each of the drums relative to each other to change the spacing between blades on respective drum units so that said blades can selectively engage different knives on the drums in different positions;

and the outer annular surface at one side of said slitting blade tapering away from the cutting edge at a first angle of less than 87° and having a second surface inwardly therefrom forming a second sharper angle with the opposing blade surface.

4. A high bulk traveling web slitter for slitting a web having a single layer or multiple layers to form a continuous slit to divide the web into narrower sheets comprising in combination:

means for supply and traveling web to be slit;

means for receiving the slit web after it has been cut;

a rotary sharp edged slitting blade positioned at one surface of the web rotating on an axis substantially perpendicular to the direction of web travel with a blade edge cutting into the surface of the web;

and a rotary slitter drum unit on the opposite surface of the web rotatable on an axis substantially parallel with the blade axis with the drum having drum members with annular bands for supporting the web, having a circular knife for coaction with the blade and having plates of a diameter less than the knife between the blade and the drums with the drums being of different thicknesses and interchangeable to change the relative location of the blade, and a support for rotatably supporting the drum unit.

* * * * *

UNITED STATES PATENT AND TRADEMARK OFFICE

CERTIFICATE OF CORRECTION

PATENT NO. : 4,157,672

DATED : June 12, 1979

INVENTOR(S) : Kenneth G. Frye

It is certified that error appears in the above-identified patent and that said Letters Patent are hereby corrected as shown below:

Column 6, Line 53, delete "and"

Line 58, insert ---separate--- after "having"

Line 59, insert ---held--- after "knife"

Line 60, change "drums" to ---plates---

Line 62, change "," to ---;---

Signed and Sealed this

***Fourth* Day of *September 1979***

[SEAL]

*Attest:*

LUTRELLE F. PARKER

*Attesting Officer* *Acting Commissioner of Patents and Trademarks*